J. WARD.
MECHANISM FOR OPERATING VALVES.
No. 177,598. Patented May 16, 1876.
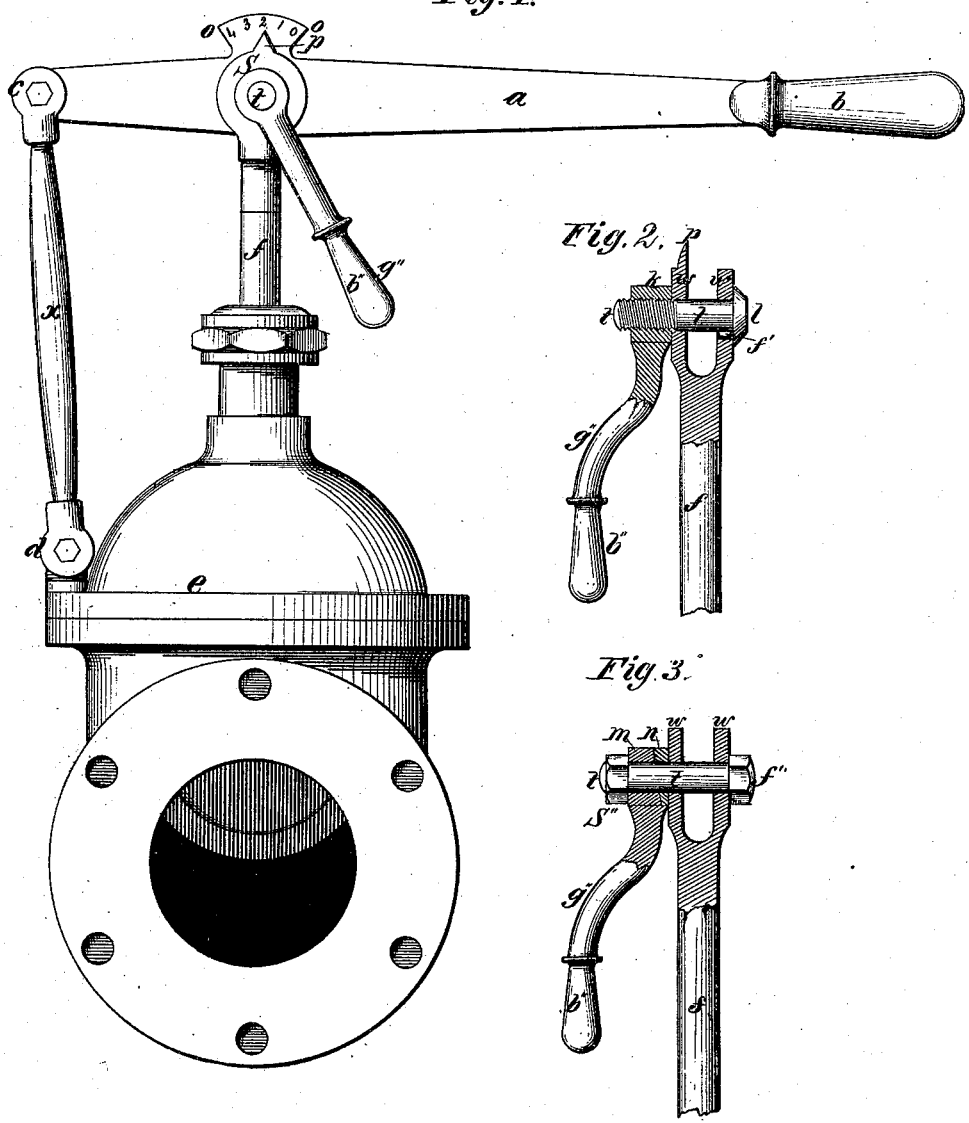

UNITED STATES PATENT OFFICE.

JOHN WARD, OF WATERFORD, ASSIGNOR TO LUDLOW VALVE COMPANY, OF TROY, NEW YORK.

IMPROVEMENT IN MECHANISMS FOR OPERATING VALVES.

Specification forming part of Letters Patent No. 177,598, dated May 16, 1876; application filed January 27, 1876.

*To all whom it may concern:*

Be it known that I, JOHN WARD, of the town of Waterford, county of Saratoga and State of New York, have invented a method of arranging a clutching device upon a valve that is opened and closed by means of a lever attached to the valve stem or rod, and also a manner of connecting with a lever so used a registering-dial arranged to designate the capacity at which the valve is opened, of which the following is a specification:

The object of my invention is to secure the valve in a fixed position when it is closed and opened by means of a lever attached to the stem or rod of the valve, and to thus prevent it from closing or opening automatically. Another feature of my invention consists in arranging upon the lever which moves the valve-stem a registering-dial, denoting by characters placed upon it the capacity at which the valve is opened. Both of these features, as I describe and illustrate them, I believe to be my invention, and they may be used separately or together. I also believe it to be a part of my invention to combine them both with the lever and stem of a valve to which they are attached in co-operating connection, or to combine either of them with a lever and valve-stem used to open and close the valve without the other.

Valves are made to open and close by means of a nut and thread upon the stem or rod, with the nut secured to the case. To the stem is attached a hand-wheel, by which the stem is screwed up or down through the nut, to open or close the valve. They are also made to open or close by means of a lever attached to the stem, with a fulcrum arranged upon the valve-case by means of a standard. When so made, the thread upon the stem and nut are dispensed with, and the latter is merely used as a guide for the stem. It is to this latter class of valves that my invention is applicable. When a valve stem or rod is thus actuated by a lever the fulcrum-standard may be joined to the valve-case between the applied lever-power and the stem, or the stem may be attached to the lever between the power and the fulcrum, and in either case the features of my invention may be applied and answer the same purpose. All the joints by which the lever and stem, and lever and fulcrum-standard, and fulcrum-standard and case are attached are made by means of hinged or adjustable joints.

When a hinged joint is formed to connect the valve-stem and lever to secure the stem of the valve in a fixed position I arrange to have the hinging-pin which connects and forms the hinged joint headed upon one end, and when it passes through and beyond the hinging parts it is keyed to the fixed portion of the hinged jaw to prevent the pin from turning. The other end of the hinging-pin projects through and beyond the hinge, and upon this projecting part I arrange a thread. Upon the threaded pin is placed a nut or threaded sleeve. To the threaded sleeve I attach a hand-wheel when the sleeve is thus used, and when a nut is employed I attach a hand-lever to the nut. When either the nut or sleeve thus threaded is screwed up on the pin by the hand wheel or lever the sleeve or nut will clutch the hinge and pinch the jaws so as to hold it in a fixed position, which prevents the valve from opening or closing automatically. This result may also be accomplished with a modification of the former means described by placing upon the projecting hinging-pin which connects the stem and stem-lever, or the fulcrum and lever, a washer, having one adjoining face parallel to the face of the hinge with which it is in contact, and the other face beveled. Upon the threaded and projecting hinging-pin, outside of the washer, is placed a threaded nut, and this nut has a beveled surface, parallel to the beveled surface of the washer, and with which it is arranged in coinciding contact. Outside of this beveled nut and washer, upon the pin, is placed another nut as a keeper. To the beveled nut is attached a hand-lever, and when the nut is screwed up on the threaded pin the beveled surface of the nut will crowd upon the beveled surface of the washer, so as to promptly crowd and force the same against the hinged parts, so as to clutch and set them in a fixed position, and so as to prevent the valve from opening or closing automatically. This manner and means, and its modification, by means of mechanical equivalents performing the same office in substantially the same manner, I believe to be a special feature of my invention—to hold the valve-stem and lever in a fixed position.

To register the capacity of the valve, as between its maximum and minimum volume of supply, I arrange a dial upon the stem-lever, on which are formed characters designating, by the position of the lever, how far the valve is opened or closed; and this register of capacity is designated by a pointer formed upon the stem or fulcrum-standard in front of the dial. This pointer is fixed upon the stem or upon the fulcrum-standard. When attached to the former it moves up and down with it, and around which the oscillating lever moves the dial. When attached to the fulcrum-standard the pointer is stationary, and the lever moves the dial which is attached to it as the lever oscillates around the pointer. In both applications of the pointer to the stem or fulcrum the lever moves the dial around the pointer in a direction representing the arc of a circle. This manner and means for indicating by a dial and pointer the opening and closing capacity of the valve, and its mechanical equivalents, in application substantially the same, I believe to be another special feature of my invention.

In the accompanying drawing there are three figures illustrating my invention, and in which Figure 1 exhibits the side view of a valve with my improvements added. The valve-case is designated by the letter $e$, the valve-stem by the letter $f$, the stem-lever at $a$, and the lever-handle at $b$, where the lever is hinged to the standard at C, and the fulcrum-standard $x$ with the hinged and adjustable joint by which it is attached to the case at $d$, with the hinging-pin at $t$, the clutching hand-lever and handle at $b''$ and $g''$, the dial upon the lever at $o\ o$, and the pointer upon the stem at $s$.

Fig. 2 represents a cross-section of the valve shown at Fig. 1, taken through the center, with the lever $a$ omitted, to show the manner of forming a hinged joint by means of the stem-lever, stem-jaws, and hinging-pin, and this figure also shows a cross-section of the pointer. Fig. 2 also illustrates the manner of applying the clutching-nut, and hand-lever attached to the nut to actuate it, and also the keeper-nut upon the pin; and it also illustrates a manner of heading and keying the hinging-pin so that it shall not turn. It designates a manner of forming the jaws upon the stem for the reception of the lever. In this figure the valve-stem is designated by the letter $f$, the jaws formed upon the stem to receive the lever by the letters $w\ w$, the hinging-pin at $t\ t$, the headed end of the pin is shown at $l$, and the key which prevents it from turning at $f'$, the clutching and threaded nut upon the projecting pin at $k$, and the hand-lever and handle which is used to actuate the nut and clutch the hinge formed on the stem-lever and stem at $b''\ g''$, while the pointer attached to the stem is designated at $p$.

Fig. 3 represents a cross-section of a valve where the lever $a$ is omitted, to show the manner of forming a clutching device by means of a beveled washer and nut. The jaws formed upon the stem are designated by the letters $w\ w$, the hinging-pin at $t\ t$, the heading-nut upon the pin at $f''$, the beveled washer upon the pin at $n$, the threaded and beveled nut at $m$, with the handle and lever to move the beveled nut so as to crowd and clutch the hinge are indicated at $g'''$ and $b''$, with the keeper-nut shown at $s$.

While I have described the lever and its modifications to actuate a valve-stem, I do not wish to be understood as claiming it or them as my invention, broadly, for I am well aware that it has been used before to actuate and move a valve-stem, and I have described it merely to show the connection it has in co-operating combination with the improvements that I have invented and combined with it.

Having thus described my invention, what I claim, and desire to secure by Letters Patent, is—

1. In combination, the valve-stem, and the stem-lever that opens and closes the valve, with a hand-wheel or hand-lever and a clutching or crowding nut upon the hinging-pin, which forms the attachment of lever and stem, to hold the same in a fixed position, substantially as shown and described.

2. The combination of valve-stem, fulcrum-standard, and stem-lever, with a registering-dial arranged upon the stem-lever, and a designating-pointer upon the end of the valve-stem, to indicate, by the position of pointer and dial, the capacity at which the valve is opened or closed, substantially as shown and described.

Signed at Troy, New York, this 22d day of January, 1876.

JOHN WARD.

JOHN H. HAWKINS,
HENRY G. LUDLOW.